US012726714B2

(12) United States Patent
Lee et al.

(10) Patent No.: US 12,726,714 B2
(45) Date of Patent: Sep. 1, 2026

(54) METHOD AND APPARATUS FOR SETTING EXPOSURE OF STRUCTURED LIGHT-BASED CAMERA RESISTANT TO EXTERNAL LIGHTING AND OBJECT REFLECTION CHARACTERISTICS AND STORAGE MEDIUM STORING INSTRUCTIONS TO PERFORM METHOD FOR SETTING EXPOSURE OF STRUCTURED LIGHT-BASED CAMERA

(71) Applicant: Research & Business Foundation SUNGKYUNKWAN UNIVERSITY, Suwon-si (KR)

(72) Inventors: Sukhan Lee, Suwon-si (KR); Hyun Woo Park, Suwon-si (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 79 days.

(21) Appl. No.: 18/755,811

(22) Filed: Jun. 27, 2024

(65) Prior Publication Data

US 2025/0008225 A1 Jan. 2, 2025

(30) Foreign Application Priority Data

Jun. 27, 2023 (KR) ........................ 10-2023-0082814

(51) Int. Cl.
*H04N 23/73* (2023.01)
*H04N 13/254* (2018.01)
*H04N 13/296* (2018.01)
*H04N 23/71* (2023.01)

(52) U.S. Cl.
CPC ........... *H04N 23/73* (2023.01); *H04N 13/296* (2018.05)

(58) Field of Classification Search
CPC ...... H04N 23/73; H04N 13/296; H04N 23/71; H04N 13/239; H04N 13/254; H04N 23/62
See application file for complete search history.

(56) References Cited

U.S. PATENT DOCUMENTS 11,070,788 B2 * 7/2021 Lee ...................... H04N 23/743
2009/0185800 A1 * 7/2009 Lee ........................ G03B 7/003
396/213

FOREIGN PATENT DOCUMENTS

KR 10-2009-0081253 A 7/2009
KR 10-2017-0048720 A 5/2017

OTHER PUBLICATIONS

Korean Office Action issued on Sep. 20, 2024, in counterpart Korean Patent Application No. 10-2023-0082814 (4 pages in English, 4 pages in Korean).

* cited by examiner

*Primary Examiner* — Ahmed A Berhan

(57) ABSTRACT

There is provided a method of setting exposure of a structured light 3-dimension (3D) camera generating a 3D image of an object. The method comprises setting at least one of exposure threshold values of the structured light 3D camera to capture images; receiving a first captured image from among the images the structured light 3D camera; calculating a first exposure time of the 3D camera based on the at least one of exposure threshold values; receiving a second captured image among the images from the structured light 3D camera; and calculating an optimal exposure time of the structured light 3D.

18 Claims, 9 Drawing Sheets

*FIG. 10*

| No | 2D CAPTURED IMAGE | 3D IMAGE OF PRESENT DISCLOSURE | 3D IMAGE OF PRIOR ART |
|---|---|---|---|
| 1 | | | |
| 2 | | | |
| 3 | | | |

METHOD AND APPARATUS FOR SETTING EXPOSURE OF STRUCTURED LIGHT-BASED CAMERA RESISTANT TO EXTERNAL LIGHTING AND OBJECT REFLECTION CHARACTERISTICS AND STORAGE MEDIUM STORING INSTRUCTIONS TO PERFORM METHOD FOR SETTING EXPOSURE OF STRUCTURED LIGHT-BASED CAMERA

TECHNICAL FIELD

The present disclosure relates to a method and device for setting exposure of a structured light 3D camera.

This work was partly supported by Korea Creative Content Agency (KOCCA) grant funded by the Korea government (MCST; Ministry of Culture, Sports and Tourism) (Development of Technology for Acquisition and Authoring of 3D Precision Information on Microstructures for Ultra-Precision Cultural Heritage Restoration (No. RS-2023-00227749)) and Institute of Information & communications Technology Planning & Evaluation (IITP) grant funded by the Korea government) grant funded by the Korea government (MSIT; Ministry of Science and ICT) (Development and Validation of 5G Edge Brain-Based Integrated Control Solutions for Intelligent Manufacturing Equipment and Robotics in Logistics Processes (No. 2022-0-00067-002), Artificial Intelligence Graduate School Support Program (No. 2019-0-00421-005), and ICT Elite Talent Development Support Program (No. 2020-0-01821-004)).

BACKGROUND

Techniques for restoring the three-dimensional shape of an object using a camera can be largely divided into active techniques and passive techniques. Representative active techniques include laser triangulation and structured light-based technique, and representative passive techniques include stereo vision. Active techniques have higher precision than passive techniques and are mainly used for industrial or research purposes.

A 3D camera that uses structured light is a variation of a stereo camera. Unlike a stereo camera that uses two identical cameras, a 3D camera is configured using a projection device such as a beam projector instead of one of two identical cameras.

In such a structured light camera system, after a pattern is projected onto an object using a projection means, the object on which the pattern is projected is imaged using an image capturing means such as a camera, and the obtained image is analyzed to obtain three-dimensional information on the object.

That is, while stereo camera systems passively use only features from images, structured light camera systems actively use patterns projected from a projection means as features and thus have a high processing speed and spatial resolution. Because of these advantages, structured light camera systems are widely used in object modeling/recognition, 3D measurement, industrial inspection, reverse engineering, etc.

However, in a conventional structured light camera system, when a pattern is projected onto an object with a low reflection coefficient, e.g., a black ball, it is difficult to obtain an accurate pattern with respect to the object from an obtained image.

In addition, in the conventional structured light camera system, when a pattern is projected onto an object with a high reflection coefficient, for example, a glossy white ball, it is difficult to obtain an accurate pattern with respect to the object due to pattern blurring occurs in an obtained image.

SUMMARY

An object of the present disclosure is to provide a method and device capable of automatically setting an optimal exposure time and number of exposures in a structured light-based 3D camera.

In accordance with an aspect of the present disclosure, there is provided a method for setting exposure of a structured light 3-dimension (3D) camera generating a 3D image of an object, the method comprises: setting at least one of exposure threshold values of the structured light 3D camera to capture images; receiving a first captured image among the images from the structured light 3D camera; calculating a first exposure time of the 3D camera from the first captured image based on the at least one of exposure threshold values; receiving a second captured image among the images from the structured light 3D camera; and calculating an optimal exposure time of the structured light 3D camera from the second captured image based on the at least one of exposure threshold values and the first exposure time.

The setting the at least one of exposure threshold values may includes receiving a captured image of a first object among the images from the structured light 3D camera; calculating variations in pixel values of a plurality of pixels included in the captured image of the first object; setting a first threshold value for overexposed pixels among the plurality of pixels included in the captured image of the first object based on the variations in the pixel values; and setting a second threshold value for underexposed pixels among the plurality of pixels included in the captured image of the first object based on the variations in the pixel values.

The first threshold value may be set to a pixel value of a pixel having a pixel value variation of approximately 5% or less among the plurality of pixels included in the captured image of the first object.

The second threshold value may be set to a pixel value of a pixel having a pixel value variation of approximately 20% or less among the plurality of pixels included in the captured image of the first object.

The calculating the first exposure time may include calculating a pixel slope for each pixel included in the first captured image based on a preset initial exposure time; adjusting a pixel value of each pixel included in the first captured image based on the pixel slope; determining whether a maximum value and a minimum value among adjusted pixel values correspond to a slope set based on the at least one of exposure threshold values; and calculating the first exposure time based on a determination result.

The adjusting the pixel value may include calculating a ratio of overexposed pixels and a ratio of underexposed pixels to the plurality of pixels included in the first captured image based on the at least one of exposure threshold values; adjusting the pixel value by reducing the initial exposure time if the overexposed pixel ratio exceeds a first reference value; adjusting the pixel value by increasing the initial exposure time if the overexposed pixel ratio is equal to or less than the first reference value and the underexposed pixel ratio is less than a second reference value; and maintaining the pixel value if the overexposed pixel ratio is equal to or less than the first reference value and the underexposed pixel ratio is equal to or greater than the second reference value.

The adjusting the pixel value by reducing the initial exposure time may include reducing the initial exposure time by a value obtained by dividing a threshold value for underexposed pixels among the at least one of exposure threshold values by a maximum value of the previously calculated pixel slope; and adjusting the pixel value of each pixel to satisfy the pixel slope based on the reduced initial exposure time.

The adjusting the pixel value by increasing the initial exposure time may include increasing the initial exposure time by a value obtained by dividing a threshold value for overexposed pixels among the at least one of exposure threshold values by a minimum value of the previously calculated pixel slope; and adjusting the pixel value of each pixel to satisfy the pixel slope based on the increased initial exposure time.

The calculating the optimal exposure time may include calculating a pixel slope for each pixel included in the second captured image based on the previously calculated first exposure time; adjusting a pixel value of each pixel included in the second captured image based on the pixel slope; determining whether a maximum value and a minimum value among adjusted pixel values correspond to a slope set based on the at least one of exposure threshold values; and calculating the optimal exposure time based on a determination result.

The adjusting the pixel value may include calculating a ratio of overexposed pixels and a ratio of underexposed pixels to the plurality of pixels included in the second captured image based on the at least one of exposure threshold values; adjusting the pixel value by reducing the first exposure time if the overexposed pixel ratio exceeds a first reference value; adjusting the pixel value by increasing the first exposure time if the overexposed pixel ratio is equal to or less than the first reference value and the underexposed pixel ratio is less than a second reference value; and maintaining the pixel value if the overexposed pixel ratio is equal to or less than the first reference value and the underexposed pixel ratio is equal to or greater than the second reference value.

The adjusting the pixel value by reducing the first exposure time may include reducing the first exposure time by a value obtained by dividing a threshold value for underexposed pixels among the at least one of exposure threshold values by a maximum value of the previously calculated pixel slope; and adjusting the pixel value of each pixel to satisfy the pixel slope based on the reduced first exposure time.

The adjusting the pixel value by increasing the first exposure time may include increasing the first exposure time by a value obtained by dividing a threshold value for overexposed pixels among the at least one of exposure threshold values by a minimum value of the previously calculated pixel slope; and adjusting the pixel value of each pixel to satisfy the pixel slope based on the increased first exposure time.

Herein, the first captured image is an image of a second object captured by the structured light 3D camera in a first image-capturing environment, and the second captured image is an image of the second object captured by the 3D camera in a second image-capturing environment.

In accordance with another aspect of the present disclosure, there is provided an apparatus for setting exposure of a structured light 3-dimension (3D) camera generating a 3D image of an object, the apparatus comprises a memory configured to store a program for setting a exposure time of a structured light 3-dimension; and a processor configured to execute the program for setting the exposure time stored in the memory, wherein the program for setting the exposure time, when executed by the processor, cause the processor to: set at least one of exposure threshold values of the structured light 3D camera to capture images; receive a first captured image among the images from the structured light 3D camera; calculate a first exposure time of the 3D camera from the first captured image based on the at least one of exposure threshold values; receive a second captured image among the images from the structured light 3D camera; and calculate an optimal exposure time of the structured light 3D camera from the second captured image based on the at least one of exposure threshold values and the first exposure time.

The processor may be configured to receive a captured image of a first object among the images from the structured light 3D camera; calculate variations in pixel values of a plurality of pixels included in the captured image of the first object; and setting the at least one of exposure threshold values including a first threshold value for overexposed pixels and a second threshold value for underexposed pixels among the plurality of pixels included in the captured image of the first object based on the variations in the pixel values.

The first threshold value may be set to a pixel value of a pixel having a pixel value variation of approximately 5% or less among the plurality of pixels included in the captured image of the first object.

The second threshold value may be set to a pixel value of a pixel having a pixel value variation of approximately 20% or less among the plurality of pixels included in the captured image of the first object.

The processor may be configured to calculate a pixel slope for each pixel included in the first captured image based on a preset initial exposure time; adjust a pixel value of each pixel included in the first captured image based on the pixel slope; determine whether a maximum value and a minimum value among adjusted pixel values correspond to a slope set based on the at least one of exposure threshold values; and calculate the first exposure time based on a determination result.

The processor may be configured to calculate a ratio of overexposed pixels and a ratio of underexposed pixels to the plurality of pixels included in the first captured image based on the at least one of exposure threshold values; adjust the pixel value by reducing the initial exposure time if the overexposed pixel ratio exceeds a first reference value; adjust the pixel value by increasing the initial exposure time if the overexposed pixel ratio is equal to or less than the first reference value and the underexposed pixel ratio is less than a second reference value; and maintain the pixel value if the overexposed pixel ratio is equal to or less than the first reference value and the underexposed pixel ratio is equal to or greater than the second reference value.

The processor may be configured to reduce the initial exposure time by a value obtained by dividing a threshold value for underexposed pixels among the at least one of exposure threshold values by a maximum value of the previously calculated pixel slope; and increase the initial exposure time by a value obtained by dividing a threshold value for overexposed pixels among the at least one of exposure threshold values by a minimum value of the previously calculated pixel slope.

The processor may be configured to calculate a pixel slope for each pixel included in the second captured image based on the previously calculated first exposure time; adjust a pixel value of each pixel included in the second captured image based on the pixel slope; determine whether a maximum value and a minimum value among adjusted pixel values correspond to a slope set based on the at least one of exposure threshold values; and calculate the optimal exposure time based on a determination result.

The processor may be configured to calculate a ratio of overexposed pixels and a ratio of underexposed pixels to the plurality of pixels included in the second captured image based on the at least one of exposure threshold values; adjust the pixel value by reducing the first exposure time if the overexposed pixel ratio exceeds a first reference value; adjust the pixel value by increasing the first exposure time if the overexposed pixel ratio is equal to or less than the first reference value and the underexposed pixel ratio is less than a second reference value; and maintain the pixel value if the overexposed pixel ratio is equal to or less than the first reference value and the underexposed pixel ratio is equal to or greater than the second reference value.

The processor may be configured to reduce the first exposure time by a value obtained by dividing a threshold value for underexposed pixels among the at least one of exposure threshold values by a maximum value of the previously calculated pixel slope; and increasing the first exposure time by a value obtained by dividing a threshold value for overexposed pixels among the at least one of exposure threshold values by a minimum value of the previously calculated pixel slope. The present disclosure can set an optimal exposure time and number of exposures for a structured light 3D camera that captures an image of an object by adjusting image pixel values depending on reflection characteristics of the object from 3D images of the object captured in different image-capturing environments.

Therefore, according to the present disclosure, by capturing an image of an object with an optimal exposure time and number of exposures using a structured light 3D camera, it is possible to obtain a high-quality 3D image of the object, that is, a maximum number of 3D point clouds for the object, within the exposure range of the camera even if there are constraints such as reflectivity or saturation of the object, and thus obtain an accurate 3D image of the object.

BRIEF DESCRIPTION OF THE DRAWINGS

FIG. 10 is a diagram showing 3D images output from a 3D camera according to an embodiment of the present disclosure.

DETAILED DESCRIPTION

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

Hereinafter, the embodiments of the present invention will be described in detail with reference to the accompanying drawings.

Figure 1:
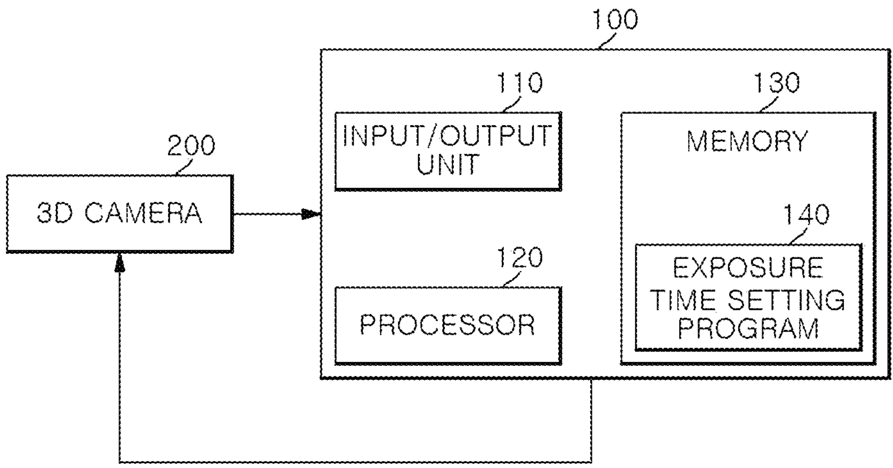
FIG. 1 is a diagram showing a device for setting exposure of a 3D camera according to an embodiment of the present disclosure.

FIG. 1 is a diagram showing a device for setting exposure of a 3D camera (hereinafter referred to as an "exposure setting device") according to an embodiment of the present disclosure.

Referring to FIG. 1, the exposure setting device 100 according to the present embodiment may control the operation of an external 3D camera 200 to receive a 3D captured image of an object from the 3D camera 200, and calculate an optimal exposure time of the 3D camera 200 based on the received 3D captured image.

The exposure setting device 100 may output the calculated optimal exposure time to the 3D camera 200 and set the calculated optimal exposure time as the camera exposure time, and the 3D camera 200 may adjust the aperture or shutter speed depending on the set exposure time to obtain an accurate 3D image of the object.

Here, the 3D camera 200 may include a 2D vision camera (not shown), a pattern projector (not shown), and a pattern generator (not shown). The exposure setting device 100 may control the operation of the pattern generator of the 3D camera 200 to receive a plurality of 3D captured images of an object captured in different environments from the 3D camera 200.

For example, the exposure setting device 100 may control the operation of the pattern generator of the 3D camera 200 such that a white frame is projected from the pattern projector.

Accordingly, the 3D camera 200 may provide a 3D captured image of a first object in a first image-capturing environment including ambient light and the white frame.

Here, the first object may be at least one of objects having different saturations and reflectivities, for example, black paper, gray paper, and white paper. Additionally, the 3D camera 200 may output a plurality of captured images of the first object in a first environment while changing a preset initial exposure time.

Additionally, the exposure setting device 100 may control the operation of the pattern generator of the 3D camera 200 to maintain the above-described first image-capturing environment, that is, the first image-capturing environment including ambient light and a white frame. Accordingly, the 3D camera 200 may output a 3D captured image of a second object, for example, a first captured image, in the first image-capturing environment.

Additionally, the exposure setting device 100 may control the operation of the pattern generator of the 3D camera 200 such that a predetermined pattern frame is projected from the pattern projector. Accordingly, the 3D camera 200 may output a 3D captured image of the second object, for example, a second captured image, in a second image-capturing environment including ambient light and the pattern frame.

Here, the second object may be an object to be actually imaged using the 3D camera 200. The second object may have a predetermined reflectivity and saturation.

Accordingly, the exposure setting device 100 of the present embodiment may receive a captured image of the first object and a captured image of the second object, for example, the first captured image and the second captured image, from the 3D camera 200, and calculate an optimal exposure time of the 3D camera 200 based on the captured images. Here, the exposure setting device 100 may sequentially receive the captured image of the first object and the captured image of the second object from the 3D camera 200.

The exposure setting device 100 may include an input/output unit 110, a processor 120, and a memory 130.

The input/output unit 110 may receive captured images of the first object or the second object captured in different image-capturing environments from the 3D camera 200. Additionally, the input/output unit 110 may output an optimal exposure time for the 3D camera 200 calculated by the processor 120 to the 3D camera 200.

The processor 120 may receive one or more captured images from the input/output unit 110 and calculate the optimal exposure time of the 3D camera 200 using an exposure time setting program 140 stored in the memory 130, which will be described later. The processor 120 may provide the calculated optimal exposure time to the 3D camera 200 through the input/output unit 110.

The memory 130 may store the exposure time setting program 140 and information necessary to execute the exposure time setting program 140. The exposure time setting program 140 may be software including instructions for calculating an optimal exposure time of a camera from captured images provided through the input/output unit 110.

Accordingly, the processor 120 may execute the exposure time setting program 140 stored in the memory 130, calculate the optimal exposure time for the 3D camera 200 from captured images received through the input/output unit 110 using the exposure time setting program 140, and provide the optimal exposure time such that an object capturing operation of the 3D camera 200 is controlled based on the optimal exposure time.

Figure 2:
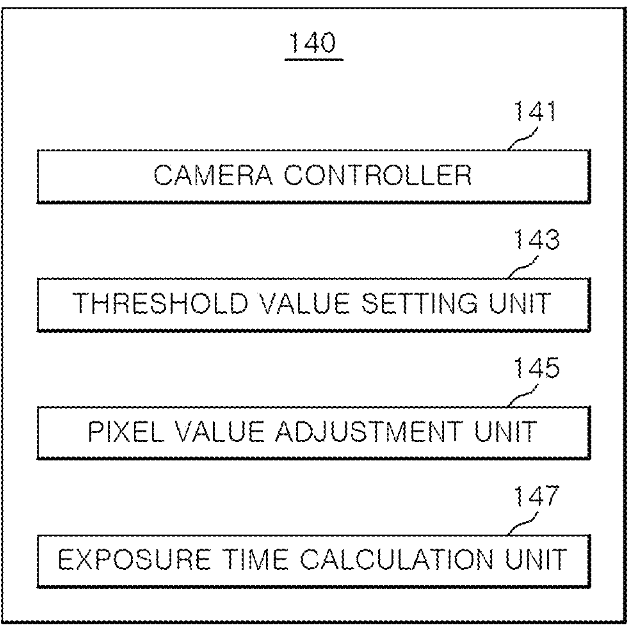
FIG. 2 is a diagram conceptually showing the function of the exposure time setting program of FIG. 1.

FIG. 2 is a diagram conceptually showing the function of the exposure time setting program of FIG. 1.

Referring to FIG. 2, the exposure time setting program 140 of the present embodiment may include a camera controller 141, a threshold value setting unit 143, a pixel value adjustment unit 145, and an exposure time calculation unit 147.

The camera controller 141, the threshold value setting unit 143, the pixel value adjustment unit 145, and the exposure time calculation unit 147 shown in FIG. 2 are conceptually divided components for easily describing the function of the exposure time setting program 140, and the present disclosure is not limited thereto.

For example, the functions of the camera controller 141, the threshold value setting unit 143, the pixel value adjustment unit 145, and the exposure time calculation unit 147 may be merged or separated, and may also be implemented as instructions included in one program.

The camera controller 141 may control the operation of the 3D camera 200 to allow the 3D camera 200 to capture images of the first object or the second object in different image-capturing environments.

For example, the camera controller 141 may control the 3D camera 200 such that an image of the first object captured in the first image-capturing environment is output from the 3D camera 300. To this end, the camera controller 141 may control the operation of the pattern generator of the 3D camera 200 such that a white frame is projected from the pattern projector.

Accordingly, the 3D camera 200 may capture an image of the first object in the first image-capturing environment including ambient light and the white frame and output a captured image.

Additionally, the camera controller 141 may control the 3D camera 200 such that the first captured image of the second object in the second image-capturing environment is output from the 3D camera 200. To this end, the camera controller 141 may control the operation of the pattern generator of the 3D camera 200 such that the pattern projector does not operate.

Accordingly, the 3D camera 200 may capture an image of the second object in the second image-capturing environment including ambient light and output the first captured image accordingly.

Additionally, the camera controller 141 may control the 3D camera 200 such that the second captured image of the second object in the above-described first image-capturing environment is output from the 3D camera 200. To this end, the camera controller 141 may control the operation of the pattern generator of the 3D camera 200 such that a white frame is projected from the pattern projector.

Accordingly, the 3D camera 200 may capture an image of the second object in the first image-capturing environment including ambient light and the white frame and output the second captured image accordingly.

Here, the 3D camera 200 may output the image of the first object captured in the first image-capturing environment and the first captured image of the second object captured in the second image-capturing environment based on a preset initial exposure time. Additionally, the 3D camera 200 may output the second captured image of the second object captured in the first image-capturing environment based on the exposure time calculated by the exposure time calculation unit 147, which will be described later.

The threshold value setting unit 143 may set exposure threshold values including a first threshold value and a second threshold value for the captured image of the first object received from the 3D camera 200 through the input/output unit 110 based on the captured image.

For example, the threshold value setting unit 143 may extract pixel values of a plurality of pixels of the captured image of the first object and calculate variation in the extracted pixel values.

To this end, the 3D camera 200 may capture the first object a plurality of times based on a preset initial exposure time in the first image-capturing environment and output a plurality of captured images. The threshold value setting unit 143 may extract pixel values of a plurality of pixels from the plurality of captured images, and calculate variation in pixel values according to the exposure time for pixels at the same position among the plurality of extracted pixel values.

The threshold value setting unit 143 may set a pixel value corresponding to an overexposed pixel among the pixel values of the plurality of pixels of the captured images of the first object as an overexposed pixel threshold value, that is, the first threshold value, based on the calculated pixel value variation.

In addition, the threshold value setting unit 143 may set a pixel value corresponding to an underexposed pixel among the pixel values of the plurality of pixels of the captured images of the first object as an underexposed pixel threshold value, that is, the second threshold value, based on the calculated pixel value variation.

For example, if the pixel values of a plurality of pixels of a captured image range from 0 to 255, the threshold value setting unit 143 may set, as the first threshold value, a pixel value of approximately 240 which as a variation equal to or less than 5% of the total variation. Additionally, the threshold value setting unit 143 may set, as the second threshold value, a pixel value of approximately 30 which has a variation equal to or less than 20% of the total variation.

The pixel value adjustment unit 145 may adjust the pixel values of a plurality of pixels of the first captured image of the second object provided from the 3D camera 200 based on a preset initial exposure time.

In addition, the pixel value adjustment unit 145 may adjust the pixel values of a plurality of pixels of the second captured image of the second object provided from the 3D camera 200 based on a first exposure time calculated by the exposure time calculation unit 147, which will be described later.

For example, the pixel value adjustment unit 145 may calculate a pixel slope for the plurality of pixels of the first captured image based on the initial exposure time.

The pixel value adjustment unit 145 may calculate the ratio of overexposed pixels exceeding the first threshold value to the plurality of pixels of the first captured image, and calculate the ratio of underexposed pixels below the second threshold value to the plurality of pixels.

The pixel value adjustment unit 145 may compare each of the overexposed pixel ratio and the underexposed pixel ratio with a preset reference value and adjust the initial exposure time depending on comparison results. By adjusting the initial exposure time, the pixel value adjustment unit 145 may adjust the pixel values of the plurality of pixels of the first captured image such that the previously calculated pixel slope of the first captured image is satisfied.

Additionally, the pixel value adjustment unit 145 may calculate a pixel slope for the plurality of pixels of the second captured image based on the first exposure time.

The pixel value adjustment unit 145 may calculate the ratio of overexposed pixels exceeding the first threshold value to the plurality of pixels of the second captured image, and calculate the ratio of underexposed pixels below the second threshold value to the plurality of pixels.

The pixel value adjustment unit 145 may compare each of the overexposed pixel ratio and the underexposed pixel ratio with a preset reference value and adjust the first exposure time depending on comparison results. By adjusting the first exposure time, the pixel value adjustment unit 145 may adjust the pixel values of the plurality of pixels of the second captured image such that the previously calculated pixel slope of the second captured image is satisfied.

The exposure time calculation unit 147 may calculate an exposure time of the 3D camera 200 for the first captured image, for example, the first exposure time, based on the adjusted pixel values of the first captured image. Additionally, the exposure time calculation unit 147 may calculate an exposure time of the 3D camera 200 for the second captured image, for example, an optimal exposure time, based on the adjusted pixel values of the second captured image.

For example, the exposure time calculation unit 147 may calculate a predetermined slope value based on the preset first and second threshold values. Here, the slope value may be calculated by dividing the first threshold value by the second threshold value.

The exposure time calculation unit 147 may extract a maximum value and a minimum value from the adjusted pixel values of the first captured image. The exposure time calculation unit 147 may determine whether each of the extracted maximum and minimum values corresponds to the previously calculated slope value, that is, whether the product of the minimum value and the slope value satisfies the maximum value. Subsequently, the exposure time calculation unit 147 may calculate the first exposure time for the 3D camera 200 according to the determination result.

Additionally, the exposure time calculation unit 147 may extract a maximum value and a minimum value from the adjusted pixel values of the second captured image and determine whether each of the extracted maximum and minimum values is related to the slope value. The exposure time calculation unit 147 may calculate an optimal exposure time for the 3D camera 200 according to the determination result.

The processor 120 may receive the optimal exposure time calculated by the exposure time calculation unit 147 and provide the optimal exposure time to the 3D camera 200 through the input/output unit 110. The 3D camera 200 may set the exposure time thereof based on the received optimal exposure time, and obtain an optimal 3D image of the object by adjusting the aperture value or shutter speed based on the set exposure time at the time of capturing an image of the object.

As described above, the exposure setting device 100 of the present embodiment may receive 3D captured images of objects captured through the 3D camera 200 in different image-capturing environments and adjust pixel values depending on the reflection characteristics of the objects from the 3D captured images to set an optimal exposure time of the 3D camera 200.

Additionally, the exposure setting device 100 of the present embodiment may set an optimal number of exposures of the 3D camera 200 according to the set optimal exposure time.

Accordingly, the present disclosure can capture an object through the 3D camera 200 based on the optimal exposure time and number of exposures to obtain a high-quality 3D image of the object, that is, a maximum number of high-quality 3D point clouds, within the exposure range limit of the camera. Therefore, the present disclosure can obtain accurate 3D images of various objects through the 3D camera 200 even if there are constraints such as reflectivity or saturation of the objects.

Figure 3:
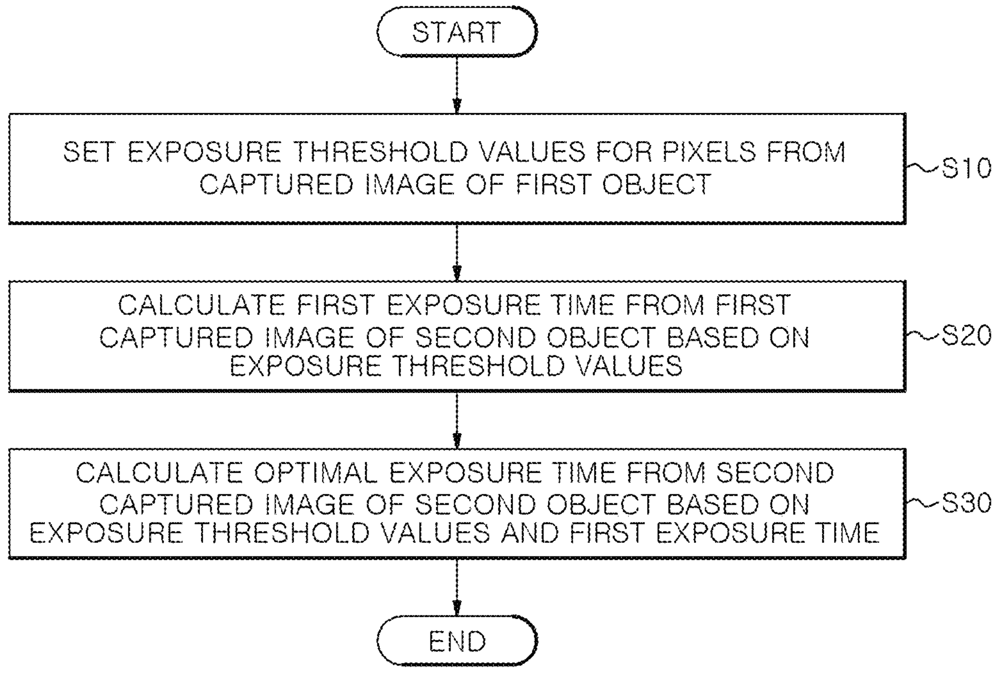
FIG. 3 is a flowchart of a method of setting exposure of a 3D camera according to an embodiment of the present disclosure.

FIG. 3 is a flowchart of a method of setting exposure of a 3D camera (hereinafter referred to as an "exposure setting method") according to an embodiment of the present disclosure.

Referring to FIG. 3, the 3D camera 200 may capture the first object in the first image-capturing environment under the control of the exposure setting device 100, and output the captured image to the input/output unit 110 of the exposure setting device 100.

For example, the camera controller 141 may control the operation of the pattern generator of the 3D camera 200 by outputting a predetermined control signal to the 3D camera 200 through the input/output unit 110. Accordingly, a white frame may be projected from the pattern projector of the 3D camera 200.

Subsequently, the 3D camera 200 may capture the first object in the first image-capturing environment including ambient light and the white frame according to a preset initial exposure time, and output the captured image. Here, the first object may be at least one of objects having different saturations and reflectivities, for example, black paper, gray paper, and white paper.

The processor 120 of the exposure setting device 100 may receive the captured image of the first object through the input/output unit 110 and execute the exposure time setting program 140 stored in the memory 130 to set one or more exposure threshold values, that is, the first threshold value and the second threshold value, from the captured image (S10).

Figure 4:
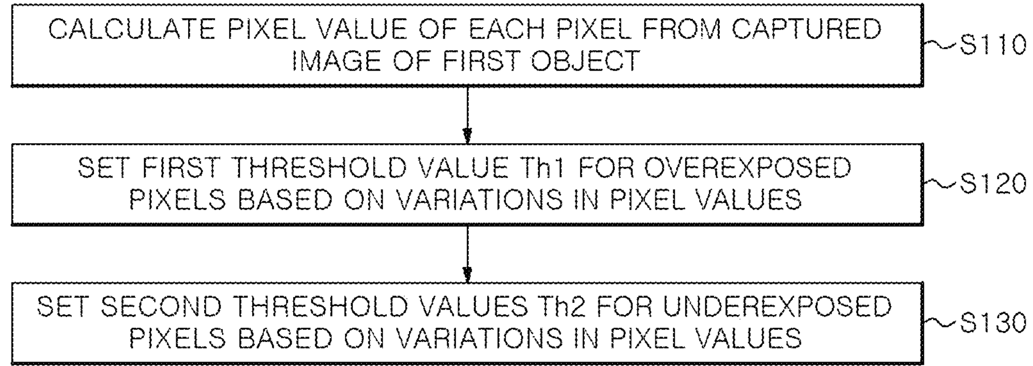
FIG. 4 is a flowchart of a method of setting an exposure threshold value in FIG. 3.
Figure 5:
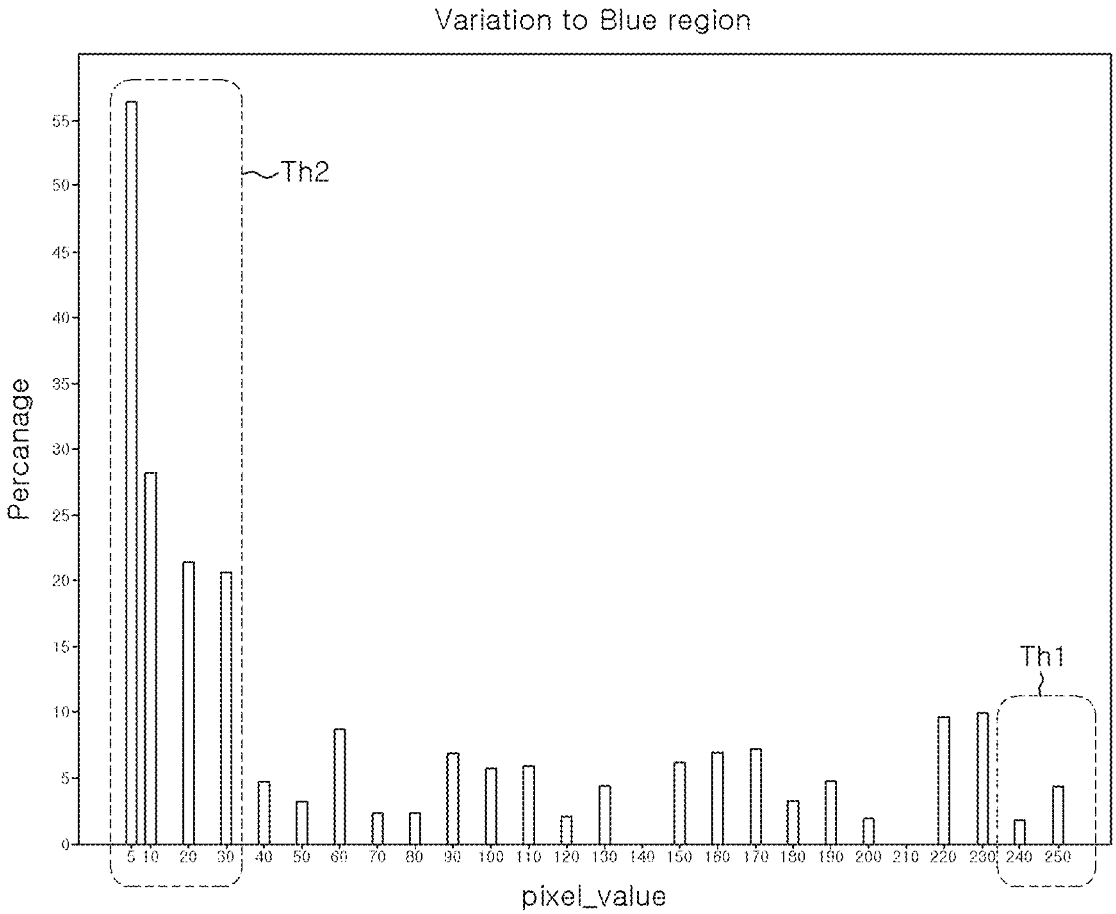
FIG. 5 is a diagram showing an example of exposure threshold values according to an embodiment of the present disclosure.

FIG. 4 is a flowchart of a method of setting an exposure threshold value in FIG. 3 and FIG. 5 is a diagram showing an example of exposure threshold values according to an embodiment of the present disclosure.

Referring to FIG. 4, the threshold value setting unit 143 may calculate pixel values of a plurality of pixels of the captured image of the first object (S110).

Subsequently, the threshold value setting unit 143 may calculate variation in the pixel values of pixels at the same position, and set a threshold value for an overexposed pixel among the plurality of pixels, that is, the first threshold value Th1, based on the calculated pixel value variation (S120).

Additionally, the threshold value setting unit 143 may set a threshold value for an underexposed pixel among the plurality of pixels, that is, the second threshold value Th2, based on the above-described pixel value variation (S130).

Here, in order for the threshold value setting unit 143 to calculate the pixel value variation, the 3D camera 200 may capture the first object a plurality of times in the first image-capturing environment based on the preset initial exposure time to produce a plurality of captured images. Accordingly, the threshold value setting unit 143 may extract pixel values of a plurality of pixels from each of the plurality of captured images, and calculate variation in pixel values of pixels at the same position among the extracted plurality of pixel values according to the exposure time.

As shown in FIG. 5, the pixel values of a plurality of pixels of captured images of the first object may be calculated as values in the range of 0 to 255.

The threshold value setting unit 143 may set, as the first threshold value Th1, a pixel value having a variation equal to or less than 5% of the total variation, for example, a pixel value of approximately 240. Additionally, the threshold value setting unit 143 may set, as the second threshold value Th2, a pixel value having a variation equal to or less than 20% of the total variation, for example, a pixel value of approximately 30.

Referring back to FIG. 3, the camera controller 141 may provide a predetermined control signal to the 3D camera 200 through the input/output unit 110 to change to the second image-capturing environment.

Accordingly, the 3D camera 200 may capture the second object in the second image-capturing environment including ambient light according to the preset initial exposure time and output the first captured image of the second object.

Subsequently, the pixel value adjustment unit 145 may adjust the pixel values of the plurality of pixels of the first captured image provided from the 3D camera 200 based on the initial exposure time. Then, the exposure time calculation unit 147 may calculate the first exposure time of the 3D camera 200 for the first captured image based on the adjusted pixel values (S20).

Figure 6:
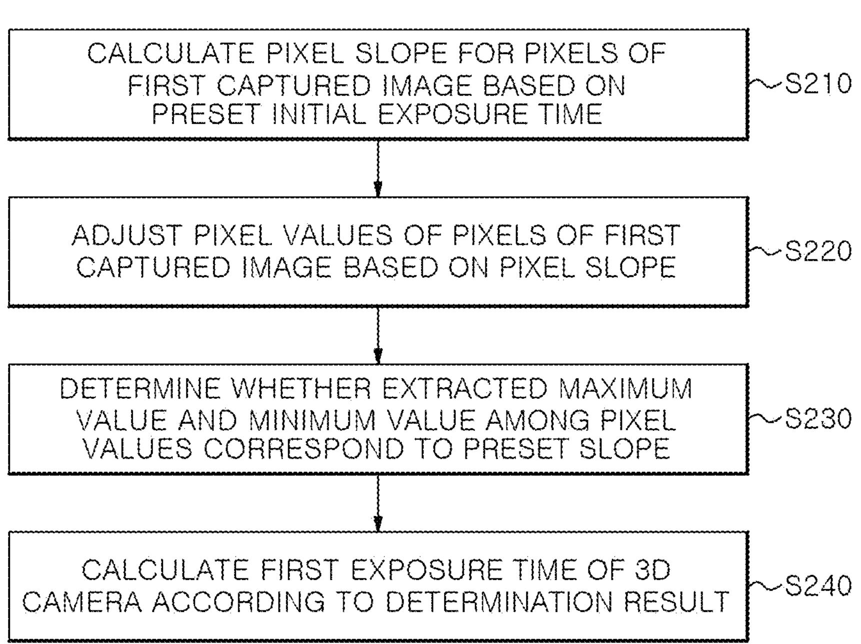
FIG. 6 is a flowchart of a method of calculating the first exposure time of the 3D camera in FIG. 3.
Figure 7:
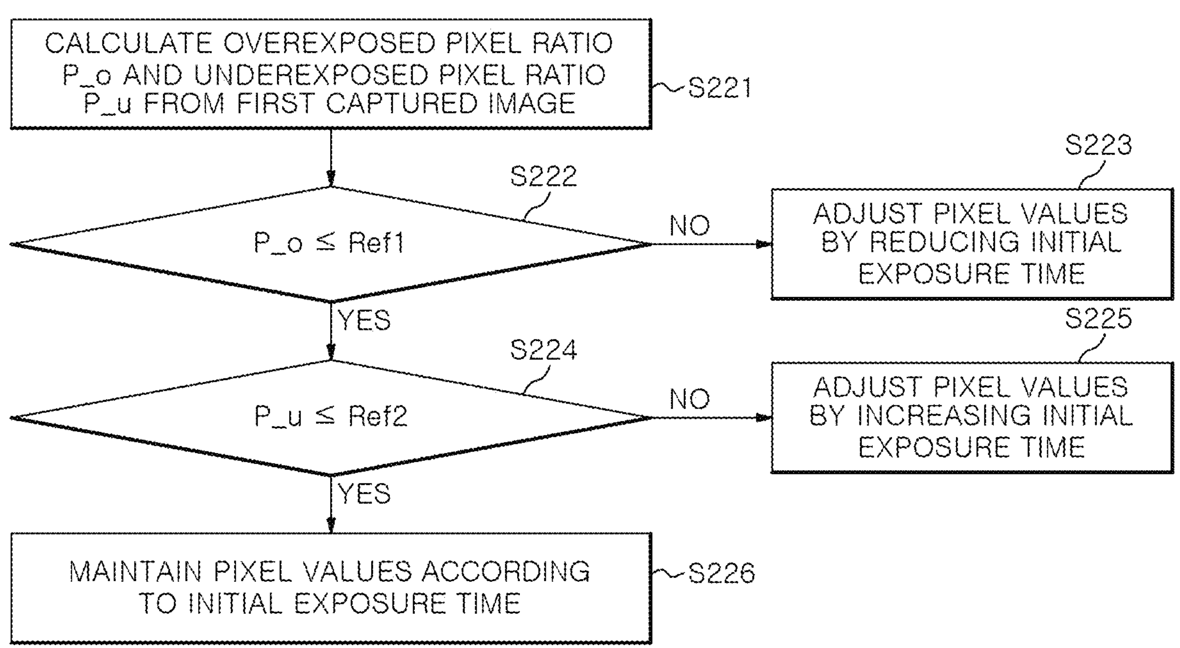
FIG. 7 is a flowchart of a method of adjusting pixel values in FIG. 6.

FIG. 6 is a flowchart of a method of calculating the first exposure time of the 3D camera in FIG. 3, and FIG. 7 is a flowchart of a method of adjusting pixel values in FIG. 6.

Referring to FIG. 6, the pixel value adjustment unit 145 may calculate a pixel slope for a plurality of pixels of the first captured image based on the initial exposure time (S210).

Here, the pixel value adjustment unit 145 may calculate the pixel slope according to [Formula 1] below.

$$SP = \frac{P\_V_2}{E\_t_0} \quad \text{[Formula 1]}$$

Here, SP represents the pixel slope, $P\_V_2$ represents the pixel value of each pixel of the first captured image, and $E\_t_0$ represents the initial exposure time.

Subsequently, the pixel value adjustment unit 145 may adjust the pixel value of each of the plurality of pixels of the first captured image based on the calculated pixel slope (S220).

Referring to FIG. 7, the pixel value adjustment unit 145 may extract overexposed pixels having pixel values exceeding the preset first threshold value from among the pixel values of the plurality of pixels of the first captured image and calculate the ratio P_o of the extracted overexposed pixels to all pixels.

Additionally, the pixel value adjustment unit 145 may extract underexposed pixels having pixel values less than the second threshold value from among the pixel values of the plurality of pixels in the first captured image and calculate the ratio P_u of the extracted underexposed pixels to all pixels (S221).

Subsequently, the pixel value adjustment unit 145 may compare the overexposed pixel ratio P_o with a preset first reference value Ref1 (S222).

If the overexposed pixel ratio P_o exceeds the first reference value as a result of comparison, the pixel value adjustment unit 145 may decrease the preset initial exposure time. Subsequently, the pixel value adjustment unit 145 may adjust the pixel values of the corresponding pixels such that the pixel slope calculated by [Formula 1] is satisfied using the reduced initial exposure time (S223).

Here, the pixel value adjustment unit 145 may reduce the initial exposure time by a value obtained by dividing the preset second threshold value Th2 by the maximum value of the pixel slope previously calculated according to [Formula 1].

Additionally, if the overexposed pixel ratio P_o is equal to or less than the first reference value as a result of comparison, the pixel value adjustment unit 145 may compare the underexposed pixel ratio P_u with a preset second reference value Ref2 (S224).

If the underexposed pixel ratio P_u exceeds the second reference value Ref2 as a result of comparison, the pixel value adjustment unit 145 may increase the preset initial exposure time. Subsequently, the pixel value adjustment unit 145 may adjust the pixel values of the corresponding pixels such that the previously calculated pixel slope is satisfied using the increased initial exposure time (S225).

Here, the pixel value adjustment unit 145 may increase the initial exposure time by a value obtained by dividing the preset first threshold value Th1 by the minimum value of the previously calculated pixel slope.

Additionally, if the overexposed pixel ratio P_o is equal to or less than the first reference value and the underexposed pixel ratio P_u is equal to or less than the second reference value Ref2 as a result of comparison, the pixel value adjustment unit 145 may maintain the previously calculated pixel values (S226).

Referring back to FIG. 6, the exposure time calculation unit 147 may calculate the first exposure time for the first captured image based on the pixel values adjusted by the pixel value adjustment unit 145.

First, the exposure time calculation unit 147 may calculate a slope value based on the first threshold value Th1 and the second threshold value Th2. Here, the slope value may be calculated by dividing the first threshold value Th1 by the second threshold value Th2.

Subsequently, the exposure time calculation unit 147 may extract a maximum value and a minimum value from the adjusted pixel values.

Then, the exposure time calculation unit 147 may determine whether the extracted maximum and minimum values correspond to the slope value (S230), and calculate the first exposure time of the 3D camera 200 depending on determination results (S240).

For example, the exposure time calculation unit 147 may determine whether the extracted maximum and minimum values satisfies [Formula] below.

$$A_{max} = \frac{Th1}{Th2} A_{min} \quad \text{[Formula 2]}$$

Here, $A_{max}$ represents the maximum value and $A_{min}$ represents the minimum value.

If the extracted maximum and minimum values satisfy [Formula 2], the exposure time calculation unit 147 may calculate the adjusted initial exposure time previously described with reference to FIG. 7 as the first exposure time.

On the other hand, if the extracted maximum and minimum values do not satisfy [Formula 2], the exposure time calculation unit 147 may calculate the first exposure time according to [Formula 3] below.

$$E\_t_1 = \alpha(A_{min} - A'_{min}) + \beta(A_{max} - A'_{max}) \quad \text{[Formula 3]}$$

Here, $A_{min}$ represents the minimum value, $A_{max}$ represents the maximum value, $A'_{min}$ represents a normal vector value of the minimum value and the slope value, $A'_{max}$ represents a normal vector value of the maximum value and the slope value, and a and β represent constant according to proportions of the numbers of maximum values and minimum values.

Referring back to FIG. 3, the camera controller 141 may provide a predetermined control signal to the 3D camera 200 through the input/output unit 110 to control the operation of the pattern generator of the 3D camera 200. Accordingly, a white frame may be projected from the pattern projector of the 3D camera 200.

Subsequently, the 3D camera 200 may capture the second object in the first image-capturing environment including ambient light and the white frame according to the previously calculated first exposure time, and produce a second captured image of the second object.

Subsequently, the pixel value adjustment unit 145 may adjust the pixel values of the plurality of pixels of the second captured image provided from the 3D camera 200 based on the first exposure time. Then, the exposure time calculation unit 147 may calculate an optimal exposure time of the 3D camera 200 for the second captured image based on the adjusted pixel values (S30).

Figure 8:
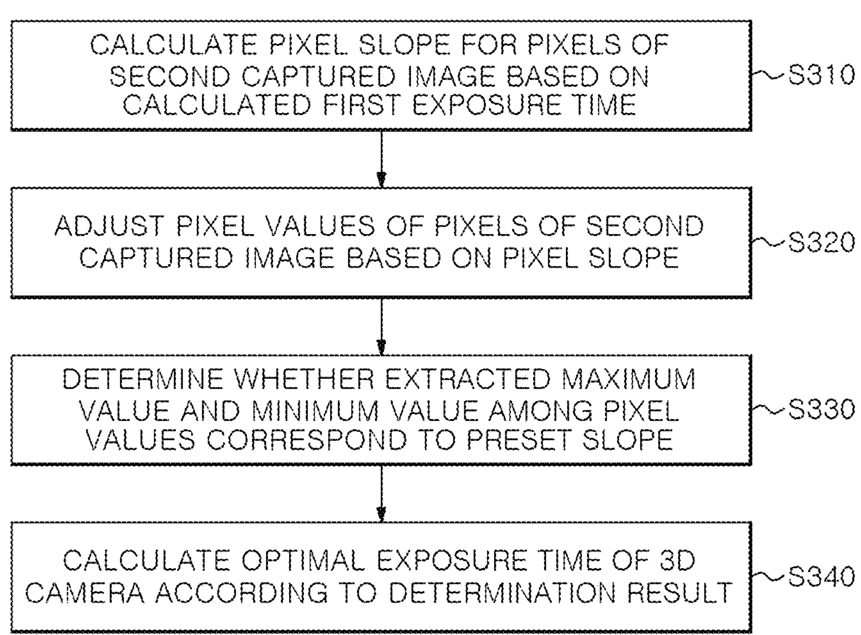
FIG. 8 is a flowchart of a method of calculating the optimal exposure time of the 3D camera in FIG. 3.
Figure 9:
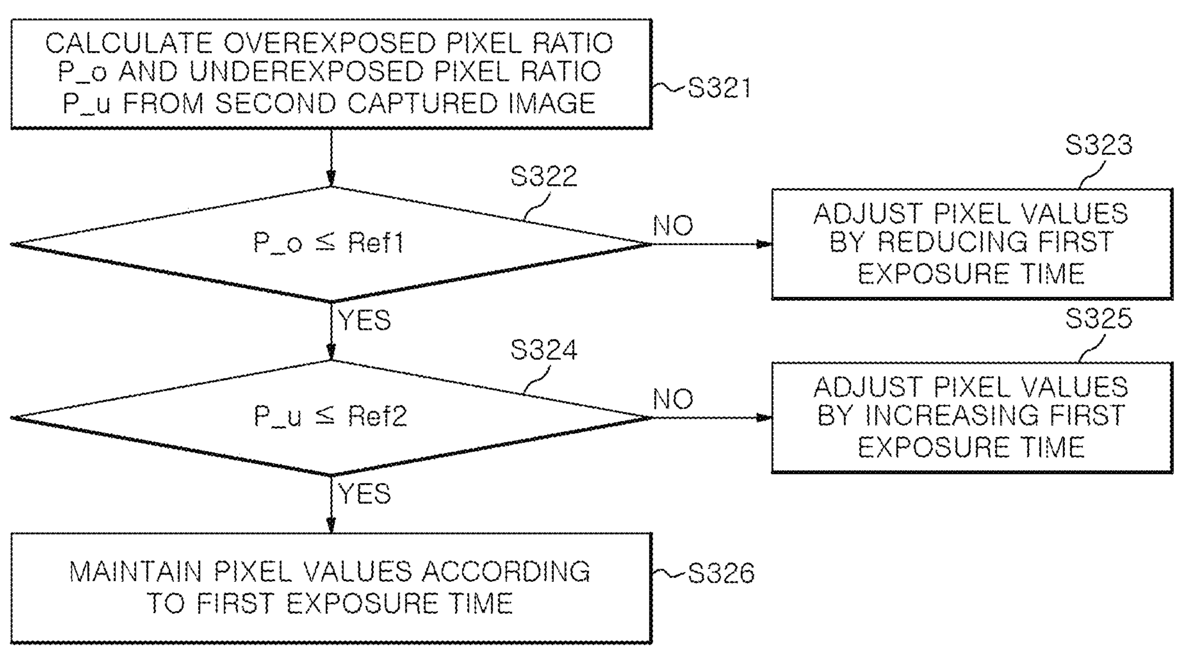
FIG. 9 is a flowchart of a method of adjusting pixel values in FIG. 8.

FIG. 8 is a flowchart of a method of calculating the optimal exposure time of the 3D camera in FIG. 3, and FIG. 9 is a flowchart of a method of adjusting pixel values in FIG. 8.

The method of calculating the optimal exposure time shown in FIG. 8 and FIG. 9 may be substantially the same as the method of calculating the first exposure time described above with reference to FIG. 6 and FIG. 7 except that a plurality of pixel values of the second captured image is adjusted based on the first exposure time calculated from the first captured image instead of the initial exposure time, and the optimal exposure time is calculated from the adjusted pixel values. Accordingly, detailed description of the method shown in FIG. 8 and FIG. 9 will be omitted.

Referring to FIG. 8, the pixel value adjustment unit 145 may calculate a pixel slope for a plurality of pixels of the second captured image based on the first exposure time (S310).

Here, the pixel value adjustment unit 145 may calculate the pixel slope by applying the pixel values of the pixels of the second captured image and the first exposure time to the above-described [Formula 1].

Referring to FIG. 9, the pixel value adjustment unit 145 may calculate the ratio P_o of overexposed pixels having pixel values exceeding the first threshold value to the plurality of pixels of the second captured image and calculate the ratio P_u of underexposed pixels having pixel values less than the second threshold value to the pixels of the second captured image (S321).

Subsequently, the pixel value adjustment unit 145 may compare the overexposed pixel ratio P_o with the preset first reference value Ref1 (S322), and if the overexposed pixel ratio P_o exceeds the first reference value Ref1, reduce the first exposure time. Then, the pixel value adjustment unit 145 may adjust the pixel values of the corresponding pixels such that the previously calculated pixel slope is satisfied using the reduced first exposure time (S323).

Here, the pixel value adjustment unit 145 may reduce the first exposure time by a value obtained by dividing the second threshold value Th2 by the maximum value of the pixel slope.

Additionally, if the overexposed pixel ratio P_o is equal to or less than the first reference value as a result of comparison, the pixel value adjustment unit 145 may compare the underexposed pixel ratio P_u with the preset second reference value Ref2 (S324).

If the underexposed pixel ratio P_u exceeds the second reference value Ref2 as a result of comparison, the pixel value adjustment unit 145 may increase the first exposure time. The pixel value adjustment unit 145 may adjust the pixel values of the corresponding pixels such that the previously calculated pixel slope is satisfied using the increased first exposure time (S325).

Here, the pixel value adjustment unit 145 may increase the first exposure time by a value obtained by the first threshold value Th1 by the minimum value of the pixel slope.

In addition, if the overexposed pixel ratio P_o is equal to or less than the first reference value Ref1 and the underexposed pixel ratio P_u is equal to or less than the second reference value Ref2, the pixel value adjustment unit 145 may maintain the previously calculated pixel values (S326).

Referring back to FIG. 8, the exposure time calculation unit 147 may calculate the slope value as a value obtained by dividing the first threshold value Th1 by the second threshold value Th2.

Subsequently, the exposure time calculation unit 147 may extract a maximum value and a minimum value from the adjusted pixel values and determine whether the maximum value and the minimum value correspond to the slope value according to the above-described [Formula 2] (S330).

If the extracted maximum and minimum values satisfy [Formula 2], the exposure time calculation unit 147 may calculate the first exposure time adjusted through FIG. 8 as an optimal exposure time (S340).

Additionally, if the extracted maximum and minimum values do not satisfy [Formula 2], the exposure time calculation unit 147 may calculate an optimal exposure time according to the above-described [Formula 3] (S340).

Next, the processor 120 may output the calculated optimal exposure time to the 3D camera 200 through the input/output unit 110.

Accordingly, the 3D camera 200 may set the exposure time and the number of exposures based on the optimal exposure time provided from the exposure setting device 100 and adjust the aperture value and shutter speed based on the set exposure time and number of exposures at the time of capturing a 3D image of an object to obtain an optimal 3D image of the object, that is, a 3D image including a maximum number of 3D point clouds for the object.

As shown in FIG. 10, it can be ascertained that a 3D image of an object, for example, an object with a metallic surface, an object with high reflectivity, or a metal object with extreme contrast, which is obtained from the 3D camera 200 whose exposure time is set through the exposure setting device 100 of the present disclosure, has a significantly larger number of 3D point clouds compared to a 3D image obtained according to the prior art. Accordingly, compared to the prior art, the present disclosure can obtain an accurate 3D image of an object regardless of the type of object.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for setting one or more exposure of a structured light 3-dimension (3D) camera generating a 3D image of an object, the method comprising:

receiving one or more images captured from the structured light 3D camera;

obtaining at least one exposure threshold value of the structured light 3D camera;

calculating at least one exposure time of the 3D camera from the one or more images based on the at least one exposure threshold value; and determining one or more exposure time of the structured light 3D camera based on the at least one exposure time from the one or more images and the at least one exposure threshold value, wherein calculating the at least one exposure time includes:

calculating a pixel slope for each pixel included in at least one of the one or more images based on an exposure time;

adjusting a pixel value of each pixel included in the one or more images based on the pixel slope;

determining whether a maximum value and a minimum value among the adjusted pixel value of each pixel correspond to a slope set based on overexposed and underexposed threshold values; and calculating the at least one exposure time based on a determination result.

2. The method of claim 1, wherein obtaining the at least one exposure threshold value includes:

receiving a captured image of a first object among the one or more images from the structured light 3D camera;

calculating variations in pixel values of a plurality of pixels included in the captured image of the first object;

setting a first threshold value for overexposed pixels among the plurality of pixels included in the captured image of the first object based on the variations in the pixel values; and setting a second threshold value for underexposed pixels among the plurality of pixels included in the captured image of the first object based on the variations in the pixel values.

3. The method of claim 2, wherein the first threshold value is set to a pixel value of a pixel having a pixel value variation of approximately 5% or less among the plurality of pixels included in the captured image of the first object, and the second threshold value is set to a pixel value of a pixel having a pixel value variation of approximately 20% or less among the plurality of pixels included in the captured image of the first object.

4. The method of claim 1, wherein the adjusting the pixel value includes:

calculating a ratio of overexposed pixels and a ratio of underexposed pixels to the plurality of pixels included in a first image based on the at least one of exposure threshold value;

adjusting the pixel value by reducing an initial exposure time if the overexposed pixel ratio exceeds a first reference value;

adjusting the pixel value by increasing the initial exposure time if the overexposed pixel ratio is equal to or less than the first reference value and the underexposed pixel ratio is less than a second reference value; and maintaining the pixel value if the overexposed pixel ratio is equal to or less than the first reference value and the underexposed pixel ratio is equal to or greater than the second reference value.

5. The method of claim 4, wherein the adjusting the pixel value by reducing the initial exposure time includes:

reducing the initial exposure time by a value obtained by dividing a threshold value for underexposed pixels among the at least one exposure threshold value by a maximum value of the previously calculated pixel slope; and adjusting the pixel value of each pixel to satisfy the pixel slope based on the reduced initial exposure time.

6. The method of claim 4, wherein the adjusting the pixel value by increasing the initial exposure time includes:

increasing the initial exposure time by a value obtained by dividing a threshold value for overexposed pixels among the at least one exposure threshold value by a minimum value of the previously calculated pixel slope; and adjusting the pixel value of each pixel to satisfy the pixel slope based on the increased initial exposure time.

7. The method of claim 1, wherein one or more captured images includes a first image and a second image, and wherein the calculating the at least one exposure time includes:

calculating a first pixel slope for each pixel included in the first image based on a preset initial exposure time;

adjusting a pixel value of each pixel included in the first image based on the first pixel slope:

determining whether a maximum value and a minimum value among adjusted pixel value of each pixel included in the first image correspond to a slope set based on the at least one exposure threshold value;

calculating a first exposure time based on a determination result of the first image;

calculating a second pixel slope for each pixel included in the second image based on the first exposure time;

adjusting a pixel value of each pixel included in the second image based on the second pixel slope;

determining whether a maximum value and a minimum value among the adjusted pixel value of each pixel included in the second image correspond to a slope set based on the at least one exposure threshold value and the first exposure time; and determining the at least one exposure time based on a determination result of the second image.

8. The method of claim 7, wherein the adjusting the pixel value includes:

calculating a ratio of overexposed pixels and a ratio of underexposed pixels to the plurality of pixels included in the second image based on the at least one exposure threshold value;

adjusting the pixel value by reducing the first exposure time if the overexposed pixel ratio exceeds a first reference value;

adjusting the pixel value by increasing the first exposure time if the overexposed pixel ratio is equal to or less than the first reference value and the underexposed pixel ratio is less than a second reference value; and maintaining the pixel value if the overexposed pixel ratio is equal to or less than the first reference value and the underexposed pixel ratio is equal to or greater than the second reference value.

9. The method of claim 8, wherein the adjusting the pixel value by reducing the first exposure time includes:

reducing the first exposure time by a value obtained by dividing a threshold value for underexposed pixels among the at least one exposure threshold value by a maximum value of the previously calculated pixel slope; and adjusting the pixel value of each pixel to satisfy the pixel slope based on the reduced first exposure time.

10. The method of claim 8, wherein the adjusting the pixel value by increasing the first exposure time includes:

increasing the first exposure time by a value obtained by dividing a threshold value for overexposed pixels among the at least one exposure threshold value by a minimum value of the previously calculated pixel slope; and adjusting the pixel value of each pixel to satisfy the pixel slope based on the increased first exposure time.

11. The method of claim 1, wherein a first image is an image of a second object captured by the structured light 3D camera in a first image-capturing environment, and a second image is an image of the second object captured by the 3D camera in a second image-capturing environment.

12. An apparatus for setting exposure of a structured light 3D camera generating a 3D image of an object, the apparatus comprising:

a memory configured to store a program for setting an exposure time of the structured light 3D camera; and a processor configured to execute the program for setting the exposure time stored in the memory, wherein the program for setting the exposure time, when executed by the processor, cause the processor to:

receive one or more images captured from the structured light 3D camera;

obtain at least one exposure threshold value of the structured light 3D camera;

calculate at least one exposure time of the 3D camera from the one or more images based on the at least one exposure threshold value; and determine one or more exposure time of the structured light 3D camera based on the at least one exposure time from the one or more images and the at least one exposure threshold value, wherein, to calculate the at least one exposure time, the processor is configured to:

calculate a pixel slope for each pixel included in at least one of the one or more images based on an exposure time;

adjust a pixel value of each pixel included in the one or more images based on the pixel slope;

determine whether a maximum value and a minimum value among the adjusted pixel values of each pixel correspond to a slope set based on overexposed and underexposed threshold values; and calculate the at least one exposure time based on a determination result.

13. The apparatus of claim 12, wherein the processor is configured to;

receive a captured image of a first object among the one or more images from the structured light 3D camera;

calculate variations in pixel values of a plurality of pixels included in the captured image of the first object; and set the at least one exposure threshold value including a first threshold value for overexposed pixels and a second threshold value for underexposed pixels among the plurality of pixels included in the captured image of the first object based on the variations in the pixel values.

14. The apparatus of claim 13, wherein the first threshold value is set to a pixel value of a pixel having a pixel value variation of approximately 5% or less among the plurality of pixels included in the captured image of the first object, and the second threshold value is set to a pixel value of a pixel having a pixel value variation of approximately 20% or less among the plurality of pixels included in the captured image of the first object.

15. The apparatus of claim 12, wherein the processor is configured to:

calculate a ratio of overexposed pixels and a ratio of underexposed pixels to the plurality of pixels included in a first image based on the at least one exposure threshold value;

adjust the pixel value by reducing an initial exposure time if the overexposed pixel ratio exceeds a first reference value;

adjust the pixel value by increasing the initial exposure time if the overexposed pixel ratio is equal to or less than the first reference value and the underexposed pixel ratio is less than a second reference value; and maintain the pixel value if the overexposed pixel ratio is equal to or less than the first reference value and the underexposed pixel ratio is equal to or greater than the second reference value.

16. The apparatus of claim 12, wherein the processor is configured to:

reduce the initial exposure time by a value obtained by dividing a threshold value for underexposed pixels among the at least one exposure threshold value by a maximum value of the previously calculated pixel slope; and increase the initial exposure time by a value obtained by dividing a threshold value for overexposed pixels among the at least one exposure threshold value by a minimum value of the previously calculated pixel slope.

17. The apparatus of claim 12, wherein the one or more images includes a first image and a second image, and wherein the processor is configured to calculate a first pixel slope for each pixel included in the first image based on a preset initial exposure time;

adjust a pixel value of each pixel included in the first image based on the first pixel slope;

determine whether a maximum value and a minimum value among adjusted pixel value of each pixel included in the first image correspond to a slope set based on the at least one of exposure threshold value;

calculate a first exposure time based on a determination result of the first image;

calculate a second pixel slope for each pixel included in the second image based on the first exposure time;

adjust a pixel value of each pixel included in the second image based on the second pixel slope;

determine whether a maximum value and a minimum value among the adjusted pixel value of each pixel included in the second image correspond to a slope set based on the at least one exposure threshold value and the first exposure time; and determine the at least one exposure time based on a determination result of the second image.

18. A non-transitory computer readable storage medium storing computer executable instructions, wherein the instructions, when executed by a processor, cause the processor to perform a method for setting exposure of a structured light 3D camera, the method comprising:

receiving one or more images captured from the structured light 3D camera;

obtaining at least one exposure threshold value of the structured light 3D camera;

calculating at least one exposure time of the 3D camera from the one or more images based on the at least one exposure threshold value; and determining one or more exposure time of the structured light 3D camera based on the at least one exposure time from the one or more images and the at least one exposure threshold value, wherein calculating the at least one exposure time includes:

calculating a pixel slope for each pixel included in at least one of the one or more images based on an exposure time;

adjusting a pixel value of each pixel included in the one or more images based on the pixel slope;

determining whether a maximum value and a minimum value among the adjusted pixel value of each pixel correspond to a slope set based on overexposed and underexposed threshold values; and calculating the at least one exposure time based on a determination result.

* * * * *